United States Patent [19]
Beardsley et al.

[11] 4,118,536
[45] Oct. 3, 1978

[54] SILANE-TERMINATED POLYCARBODIIMIDE PRIMERS AND COMPOSITE COATINGS THEREFROM

[75] Inventors: James L. Beardsley, St. Paul; J. Lamar Zollinger, Maplewood, both of Minn.

[73] Assignee: Minnesota Mining and Manufacturing Company, St. Paul, Minn.

[21] Appl. No.: 827,784

[22] Filed: Aug. 25, 1977

Related U.S. Application Data

[63] Continuation-in-part of Ser. No. 730,810, Oct. 8, 1976, abandoned.

[51] Int. Cl.$^2$ .................. B32B 27/38; C08G 18/00; C07F 7/10; C07F 7/18
[52] U.S. Cl. .................. 428/413; 260/448.2 N; 427/385 R; 427/407 R; 427/410; 428/423; 428/447; 528/23; 528/28; 528/65; 528/30

[58] Field of Search .................. 260/77.5 R, 77.5 AT, 260/448.2 N; 428/423, 426, 413

[56] References Cited

U.S. PATENT DOCUMENTS

| 3,296,190 | 1/1967 | Reischl et al. ............. 260/45.9 AA |
| 3,450,562 | 6/1969 | Hoeschele ............. 428/425 |
| 3,895,043 | 7/1975 | Wagner et al. ............. 260/448.2 N |
| 3,972,933 | 8/1976 | Lawton ............. 260/566 R |

OTHER PUBLICATIONS

Japanese Patent Publication, (Tokai), 49-117529, 11/9/74.

Primary Examiner—H. S. Cockeram
Attorney, Agent, or Firm—Cruzan Alexander; Donald M. Sell; Mark A. Litman

[57] ABSTRACT

Polycarbodiimide polymers terminated with polymerizable silane groups function well as primers for a variety of substrates and for many different coating materials.

11 Claims, No Drawings

SILANE-TERMINATED POLYCARBODIIMIDE PRIMERS AND COMPOSITE COATINGS THEREFROM

This application is a continuation-in-part of U.S. Ser. No. 730,810, filed Oct. 8, 1976, now abandoned.

One of the most desirable advantages of synthetic organic polymer chemistry has been that the properties (especially the surface properties) of materials may be improved by the addition of a suitable polymer coating to the surface of a bulk polymer. For example, paper has been rendered resistant to water or grease, and soft polymers have been rendered abrasion resistant by the addition of a surface coating of a polymer which has the desired property. A problem often encountered in protective polymer coating techniques is a lack of adhesion between the coating and the substrate. In the absence of suitable adhesion the coating cannot effectively provide protection for the substrate. This problem is frequently solved by providing an intermediate layer of material which bonds both to the surface of the substrate and to the intended coating. These intermediate bonding compositions are generally referred to as primers.

German DT-OS No. 26 55 836 discloses a novel composite wherein the intermediate layer is comprised of polymeric polycarbodiimides. These polymers have been found to be expressly good primers for polyesters and a multiplicity of substrates including metals and polyolefins. Although the carbodiimides are excellent primers for many coating materials, they have not been found to provide optimum adhesion to siliceous substrates.

Epoxy-terminated silane abrasion resistant compositions have recently been the subject of a number of patents, for example, Australian Pat. No. 483,792; Belgian Pat. No. 839,262; and Japanese Pat. Publ. (Tokai) No. 49-117529, issued Nov. 9, 1974. These cured epoxy-terminated silanes are able to provide excellent abrasion resistant coatings, but it is extremely important that the coating be firmly bonded to the substrate.

It is one aspect of the present invention to provide a novel class of polymers which have excellent properties as primers for polymeric coatings.

It is one aspect of the present invention to show novel silane terminated polycarbodiimide primers.

It is also one aspect of the present invention to show novel silane terminated polycarbodiimide primers for use with abrasion resistant coatings comprising cured epoxy-terminated silanes.

The polymers of the present invention may be described as any aromatic containing polymer having at least 1% by weight of polymer as carbodiimide groups and at least two terminal, polymerizable silane groups. The preferred polymers of this class may be represented by the formula:

$$R^1-Z-(N=C=N-R^2)_b-(N=C=N-R^3)_c-$$
$$(N=C=N-R^4)_d-(N=C=N)-Z'-R^5 \quad (I)$$

$R^1$ and $R^5$ are independently selected from $-Si(OR^6)_3$ wherein $R^6$ is independently selected from alkyl or phenyl and has no more than 10 carbon atoms, Z and Z' are independently aliphatic, aromatic, or mixed hydrocarbon which may have no more than one O or S atom in the backbone for 2 carbon atoms and having fewer than 20 carbon atoms $R^2$ and $R^4$ are independently divalent aromatic groups bonded to the adjacent N atom of the exterior carbodiimide directly from an aromatic ring, said aromatic group being free of isocyanate reactive groups and having fewer than 20 carbon atoms $R^3$ is a divalent aliphatic, aromatic, or mixed hydrocarbon group free of isocyanate reactive groups, having fewer than 20 carbon atoms $b$ is $> 0$ $c$ is 0 or 1

$d$ is 0 or a whole integer and $b+c+d$ is at least 1 and no more than 50.

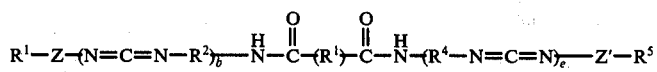

wherein $R^1$, $R^2$, $R^4$, $R^5$, $Z$, $Z'$, and $b$ are as defined above $b+e$ = at least 2 and no more than 50

$R^7$ is the hydrogen free residue of a di-(active hydrogen) terminated compound, said residue having no isocyanate reactive groups and wherein $R^2$ and $R^4$ are also directly attached to the nitrogen atom of the adjacent

group from an aromatic ring.

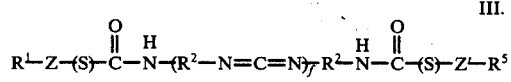

wherein
$R^1$, $R^2$, $R^5$, Z and Z' are as defined above, and $f$ is at least 2 and no more than 50.

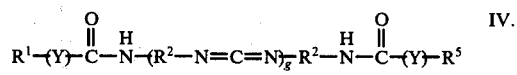

wherein
$R^1$, $R^2$, $R^5$, Z and Z' are as defined above, and $g$ is at least 2 and no more than 50, and Y is the hydrogen free residue of a primary amine terminated hydrocarbon formed by the removal of a hydrogen from the amine group portion of Y forming a bond with the adjacent group

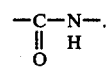

The terms aromatic groups and aliphatic groups refer to hydrocarbon groups including such substituents as would not affect their functionality by rendering them reactive with isocyanate groups. Aromatic radicals would therefore include phenyl, naphthyl, durene, tolylene, xylene,

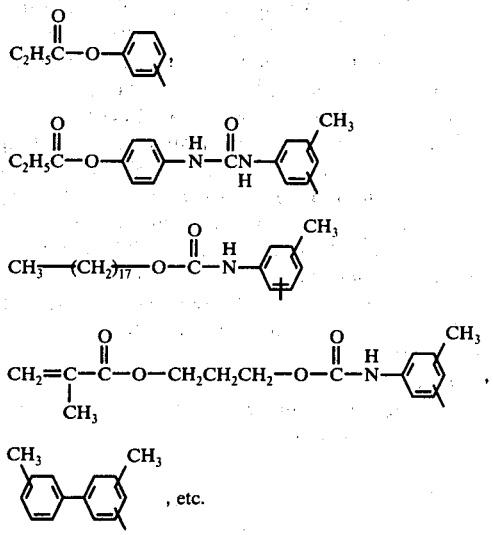

The term pure hydrocarbon excludes heteroatoms and refers to materials consisting of only carbon and hydrogen.

The term hydrogen free residue refers to a compound from which an active hydrogen has been removed. For example, the hydrogen free residue of a carboxylic acid would be

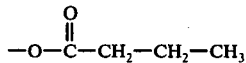

of a mercaptan would be

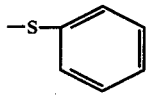

and of a primary amine would be

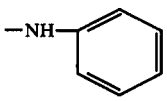

The term hydrocarbon includes both aliphatic, aromatic, and mixed hydrocarbons. The term mixed hydrocarbons refers to compounds and radicals having both aromatic and aliphatic portions, whether bonded through those portions or not, as, for example:

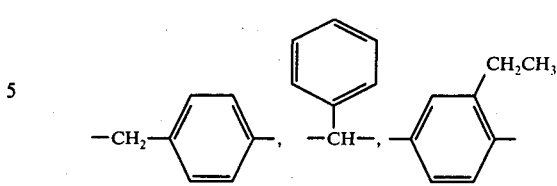

The term exterior carbodiimide clearly refers to the carbodiimide groups nearest to the silane terminating groups. The polycarbodiimides of the present invention may be mixed with other resins with which they are compatible, such as siloxanes, polyamides, etc.

Polycarbodiimides have been known as a chemical class of materials for many years. U.S. Pat. No. 2,430,479, for example, teaches the use of polycarbodiimides as an adhesive for numerous materials including plastics. Polycarbodiimides have also been found desirable as coatings and additives for coating and adhesive compositions in U.S. Pat. Nos. 3,450,562; 3,296,190; 2,415,043; 3,635,878 as well as other uses in U.S. Pat. Nos. 2,941,983; 2,941,966; and 3,929,733.

A further understanding of the invention will be obtained from the following examples.

EXAMPLE 1

87 g (1.0 equivalents) of toluene diisocyanate (80:20 of a 2,4:2,6 isomeric mixture), 24.7 g of isocyanatopropyltriethoxysilane and 2 g of a 50% solids solution of 1-phenyl-3-methyl-phospholeneoxide in methylene chloride were dissolved in 400 g of toluene, and the solution refluxed for 4 hours. Infrared analysis showed no isocyanate band (2275-2263 cm$^{-1}$) and a broad band for carbodiimides at (2150-2100 cm$^{-1}$). The reaction mixture needed no purification and was diluted to the appropriate concentration and used. The resulting polymer was believed to have the following structure:

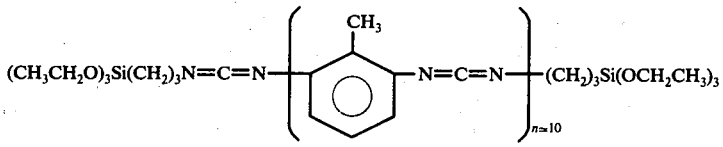

The residue of the toluene diisocyanate is drawn as the residue of only the 2,6 isomer to simplify the structure. Residues of the 2,4 isomer will of course be proportionately present within the polymer, here and in other examples where used.

EXAMPLE 2

Dihydroxypolybutadiene (28 g, 0.02 equivalents MW 2800) was dissolved in 300 g of toluene. To this solution was added 10.44 g (0.12 equivalents) of toluene diisocyanate (hereinafter, TDI). The resulting solution was refluxed for 2 hours to yield a diisocyanatopolybutadiene. To the reaction mixture was added 4.94 g (0.02 equivalents) of isocyanatopropyltriethoxysilane and 0.30 g of 1-phenyl-3-methyl-phospholeneoxide in a 50% solution in CH$_2$Cl$_2$. The solution was refluxed for 3 hours. The reaction mixture was diluted with toluene to the appropriate concentration and used without further treatment. The resulting polymer was believed to have the structure:

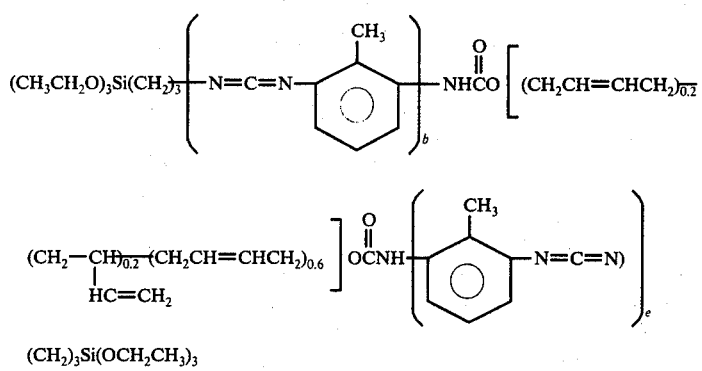

wherein $b$ and $e$ are whole integers and $b+e$ is at least 2 and less than 50.

EXAMPLE 3

44 g (0.1 equivalents) of an isocyanate terminated prepolymer (about 9.55% isocyanate) prepared from toluenediisocyanate and polytetramethylene glycol (MW 1000) was dissolved in 400 g of toluene. 43.5 g (0.5 equivalents) of toluene diisocyanate (80:20 2,4:2,6 isomeric mixture) and 24.7 g (0.1 equivalents) of isocyanatopropyltriethoxysilane were added and mixed. To this solution was added 1.35 g of 1-phenyl-3-methylphospholene-oxide as a 50% solids solution in $CH_2Cl_2$. This solution was refluxed for 4 hours. The reaction mixture was diluted with toluene to the appropriate concentration and used without purification. The resulting polymer was believed to have the following structure:

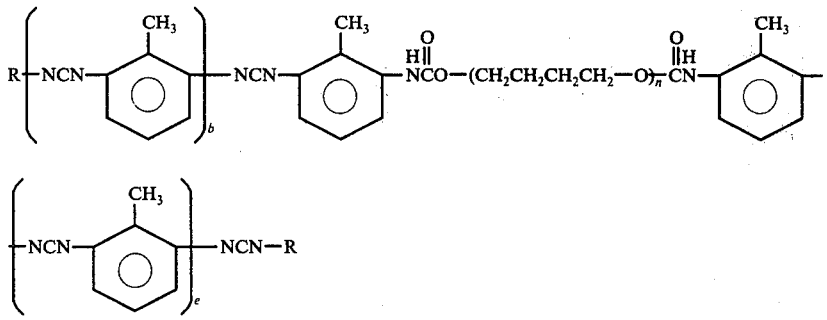

wherein $R=(CH_2)_3Si(OCH_2CH_3)_3$, and $b+e$ are as defined in Example 2. $n$ is defined by the molecular weight of the glycol.

EXAMPLE 4

87 g (1.0 equivalents) of toluenediisocyanate (an 80:20 2,4:2,6 isomeric mixture) was mixed with 19.6 g (0.1 equivalents) of 3-mercaptopropyltrimethoxysilane in 500 g of toluene. The solution was refluxed for 2 hours. The resulting mixture of TDI and isocyanate functional thiourethane was allowed to cool to room temperature and 2 g of catalyst as a 50% solids solution in dichloromethane of 1-phenyl-3-methyl-phospholene-oxide was added. This solution was refluxed for 4 hours. The reaction mixture needed no purification and was diluted to the appropriate concentration and used. The resulting polymer was believed to have the following structural formula:

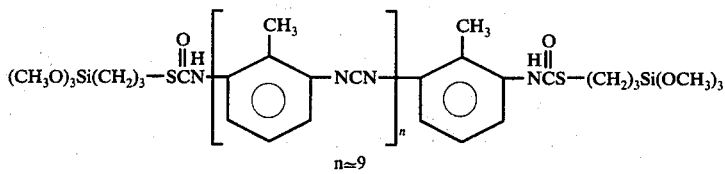

General Preparation of Primed Film

The film was coated with a toluene solution of silane terminated polycarbodiimide primer as prepared in Examples 1–4. The coating was applied using a 200 line/inch pyramidal rotogravure roll. The film was dried in a forced air oven for less than 2 minutes at 170° F. The primed film was rolled up to be used as needed.

Polyethyleneterephthalate film was primed in the manner described above using a 0.05% solids solution of primer as prepared in Example 1. The primed film was knife coated with 5 mils of a toluene/ethyl acetate solution of a silicone pressure sensitive adhesive. After coating, the film was dried and the adhesive cured 2 minutes at 250° F. in an air oven. The above construction exhibited a bond of 40 oz/½ inch width with no adhesive transfer whereas an unprimed control was 32 oz/½ inch width and 100% adhesive transfer.

The bond test involves the application of a flexible film or sheet material to the adhesive surface with pressure. The flexible sheet is then peeled from the adhesive with the force being applied to the adhesive surface at 180° and at a constant rate. The average peel force is measured as ounces/half inch width of bond.

EXAMPLE 5

3 mils of a 50/50 copolymer of isooctylacrylate and acrylic acid, 43% solids, as described in U.S. Pat. No. Re. 24,906, was knife coated onto primed polyethyleneterephthalate film. The film was primed as above using a 0.05% solids solution of primer as prepared in Example 1. The film was dried in an oven for 4 minutes at 200° F. This construction exhibited a bond of 60 oz/½ inch width with 0% adhesive transfer while an unprimed control exhibited 33 oz/½ inch width with 100% adhesive transfer.

EXAMPLE 6

A 50/50 styrene/butadiene copolymer pressure sensitive adhesive having 40% solids in toluene was knife coated (3 mils) onto polyethyleneterephthalate film primed as above using a 0.05% solids solution as prepared in Example 1. The film was dried for 4 minutes at 200° F. in an oven. The above construction displayed a bond of 106 oz/½ inch width, which delaminated the test tape, while an unprimed control exhibited 80 oz/½ inch width with 100% adhesive transfer.

EXAMPLE 7

Biaxially oriented polyethyleneterephthalate film was primed as above using a 1.0% solids solution of the primer prepared in Example 1. The primed film was coated with a solution of 10% by weight γ-glycidoxypropyltrimethoxy silane in 10 g ethylacetate and 0.12 g of $(CF_3SO_2)_2CHBr$ catalyst and cured at 90° C. for 90 minutes. This formed a tough, abrasion resistant coating according to the teachings of Belgian Pat. No. 839,262. Following curing, the resulting construction exhibited 100% crosshatched adhesion, using 3M Brand #250 tape, while an unprimed control yielded 0% adhesion.

EXAMPLE 8

Polyethyleneterephthalate film was primed as above using a 0.5% solids solution of the primer prepared in Example 3. The primed film was knife coated with 3 mils of a toluene solution of a styrene/butadiene copolymer pressure sensitive adhesive, and the film dried for 4 minutes at 200° F. This construction exhibited a bond of 110 oz/½ inch width and 0% adhesive transfer whereas an unprimed control exhibited a bond of 80 oz/½ inch width and 100% adhesive transfer.

EXAMPLE 9

Corona discharge, surface-treated biaxially oriented polypropylene film was primed as above using a 1.0% solids solution of primer as prepared in Example 1. 3 mils of a coated adhesive of isooctylacrylate and acrylic acid, as described in U.S. Pat. No. Re. 24,906, were knife coated onto the primed film. The film was air dried for 15 hours. This construction exhibited a bond of 65 oz/½ inch width with less than 20% transfer while an unprimed control exhibited 33 oz/½ inch width and 100% adhesive transfer.

EXAMPLE 10

Polyethyleneterephthalate film was primed as above using a 1.0% solids solution of primer as described in Example 2. The primed film was knife coated with 3 mils of an adhesive copolymer of isooctylacrylate and acrylic acid, 43% solids, as described in U.S. Pat. No. Re. 24,906, and the film dried in an oven for 4 minutes at 200° F. The resulting construction exhibited a bond of 58 oz/½ inch width and no adhesive transfer, while an unprimed control exhibited 33 oz/½ inch width and 100% adhesive transfer.

EXAMPLE 11

Corona treated biaxially oriented polypropylene film was primed as above using a 1% solids solution of the primer described in Example 1. The primed film was coated with the abrasion resistant composition of Example 10. Following curing, the resulting construction exhibited 100% crosshatched adhesion using 3M #250 tape, while an unprimed control yielded 0% adhesion.

EXAMPLE 12

Corona treated polyethylene was primed as above using the primer of Example 1. The primed film was knife coated at 3 mils with a 43% solids solution of a polymer of isooctylacrylate and acrylic acid in toluene and the film allowed to air dry for 15 hours. This construction exhibited a bond of 40 oz/½ inch width and 0% adhesive transfer while an unprimed control was 32 oz/½ inch width and 100% transfer.

EXAMPLE 13

12.04 g of dihydroxypolybutadiene (molecular weight of 2800) was dissolved in 250 g of toluene. To this solution was added 8.64 g of methylene bis(p-phenyl isocyanate) (isocyanate equivalent of 144). This solution was refluxed for 4 hours to form an isocyanate encapped prepolymer. 2.47 g of isocyanatopropyltriethoxysilane and 0.22 g of a 1-phenyl-3-methylphospholeneoxide 50% solution in $CH_2Cl_2$ were added to the prepolymer solution and the entire mixture refluxed for 3 hours. The reaction mixture, needing no further treatment or purification, was diluted to the appropriate concentration and used as a primer. Polyethyleneterephthalate film was primed with a 1% solids solution of this primer using a #14 wire wound applicator rod. The coated film was allowed to dry before being overcoated and cured with an epoxy-terminated coating composition comprising 10 g of 40% hydrolyzed γ-glycidoxypropyltrimethoxysilane (which had been stripped of volatiles) in 10 g of ethyl acetate containing 0.1 g of $(CF_3SO_2)_2CHC_6H_5$ and 0.2% by weight of a fluorocarbon flow agent was applied as in Example 7. This was cured at room temperature overnight. This construction yielded 100% crosshatched adhesion using 3M #250 tape, whereas an unprimed control had 0% adhesion.

The primer was believed to have the following structural formula:

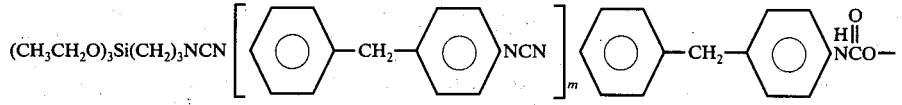

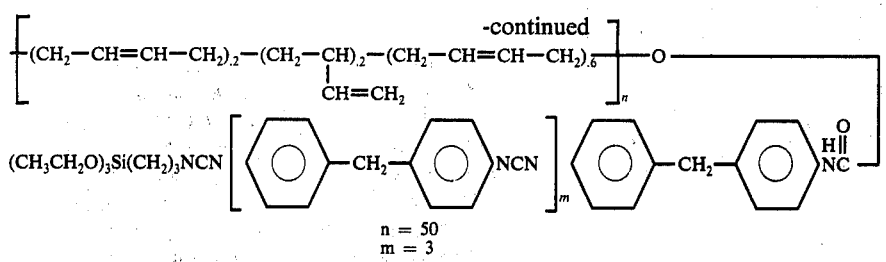

$$n = 50$$
$$m = 3$$

Any of the commercially available aromatic diisocyanates are useful in the practice of the present invention. Representative diisocyanates include 2,4-tolylene diisocyanate; 4,4'-methylene(di-p-phenylene) diisocyanate; 4,4'-diphenylene diisocyanate; 2,6-tolylene diisocyanate; m-phenylene diisocyanate; 1,5-naphthylene diisocyanate; durene diisocyanate; xylene diisocyanate; 1,8-naphthalene diisocyanate; 4,4'-oxy(di-p-phenylene) diisocyanate; 4,4'-thiooxy(di-p-phenylene) diisocyanate; 2,2'-dichloro-4,4'-methylene (di-p-phenylene) diisocyanate; bis(4-isocyanatophenyl) sulfoxide. Mixtures of two or more diisocyanates may also be used.

The primers when applied to a surface and especially when further coated with a coreactable polymeric layer do not maintain the above described structural formulae. The silane groups react to form siloxane bonds and the carbodiimide groups may react with free hydroxyl groups. It is because the precise structure of the reacted primer cannot be precisely defined that the primer is conveniently described by the structural formula of the synthesized material before coating.

EXAMPLE 14

Two polyethylene terephthalate film samples were individually primed with (A) a 1% solids solution of the phenyl terminated polycarbodiimide primer described in Example 1 of German DT-OS 26 55 836 and (B) a 1% solids solution of the silane polymer of Example 1 of this invention. The epoxy-terminated silane abrasion resistant coating composition used in Example 13 was applied to the coated films A and B and cured at room temperature for 1 hour and then heated for 15 minutes at 90° C. After immersion in boiling water for 15 minutes and subsequent air drying, cross-hatched adhesion of the coatings with 3M Brand No. 250 tape was 100% with B and 0% with A. Immersion of the films in water at room temperature showed A with 10% adhesion and B with 100% adhesion.

What we claim is:

1. An aromatic polymer containing at least 1% by weight of carbodiimide groups, said polymer selected from the formulae:

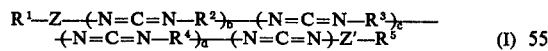  (I)

wherein $R^1$ and $R^5$ are independently selected from —Si(OR$^6$)$_3$ wherein $R^6$ is independently selected from alkyl or phenyl and has no more than 10 carbon atoms, Z and Z' are independently aliphatic, aromatic, or mixed hydrocarbon which may have no more than one O or S atom in the backbone for 2 carbon atoms and having fewer than 20 carbon atoms $R^2$ and $R^4$ are independently divalent aromatic groups bonded to the adjacent N atom of the exterior carbodiimide directly from an aromatic ring, said aromatic group being free of isocyanate reactive groups and having fewer than 20 carbon atoms $R^3$ is a divalent aliphatic, aromatic, or mixed hydrocarbon group free of isocyanate reactive groups, having fewer than 20 carbon atoms $b$ is $> 0$ $c$ is 0 or 1

$d$ is 0 or a whole integer and $b+c+d$ is at least 1 and no more than 50,

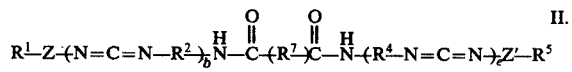  II.

wherein $R^1$, $R^2$, $R^4$, $R^5$, Z, Z', and $b$ are as defined above $b+e =$ at least 2 and no more than 50

$R^7$ is the hydrogen free residue of a di-(active hydrogen) terminated compound, said residue having no isocyanate reactive groups and wherein $R^2$ and $R^4$ are also directly attached to the nitrogen atom of the adjacent

group from an aromatic ring,

  III.

wherein $R^1$, $R^2$, $R^5$, Z and Z' are as defined above, and $f$ is at least 2 and no more than 50, and

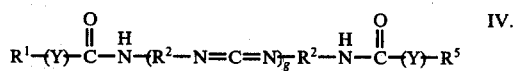  IV.

wherein $R^1$, $R^2$, $R^5$, Z and Z' are as defined above, and $g$ is at least 2 and no more than 50, and Y is the residue of a primary amine terminated hydrocarbon formed by the removal of a hydrogen from the amine group, with the hydrogen free residue portion of Y forming a bond with the adjacent group

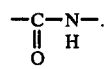

2. The polymer of claim 1 wherein Z, Z', $R^2$, $R^3$, $R^4$, $R^6$ and $R^7$ comprise only carbon and hydrogen atoms.

3. The polymer of claim 1 wherein $R^6$ is alkyl of no more than 10 carbon atoms.

4. The polymer of claim 2 wherein $R^6$ is alkyl of no more than 10 carbon atoms.

5. The polymer of claim 1 wherein $R^2$, $R^3$, and $R^4$ are selected from

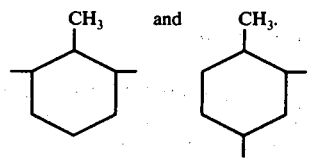

6. The polymer of claim 2 wherein $R^2$, $R^3$, and $R^4$ are selected from

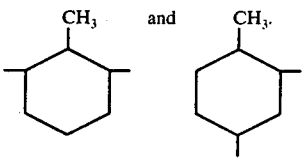

7. The polymer of claim 1 coated on a substrate.

8. The polymer of claim 6 coated on a substrate.

9. A substrate, a primer layer bonded to the substrate and a synthetic polymer layer bonded to the primer wherein said primer comprises the polymer of claim 1.

10. The substrate, primer, and synthetic polymer coating of claim 9 wherein the synthetic polymer is an abrasion resistant coating obtained by curing an epoxy-terminated silane.

11. The substrate, primer and synthetic coating of claim 10 wherein said epoxy-terminated silane comprises γ-glycidoxypropyltrimethoxysilane.

* * * * *

UNITED STATES PATENT AND TRADEMARK OFFICE
CERTIFICATE OF CORRECTION

PATENT NO. : 4,118,536

DATED : October 3, 1978

INVENTOR(S) : James L. Beardsley and J. LaMar Zollinger

It is certified that error appears in the above-identified patent and that said Letters Patent are hereby corrected as shown below:

Column 2, line 19, "... $\overset{O}{\overset{\|}{C}} \{R^1\} \overset{O}{\overset{\|}{C}}$ ..." should be -- ... $\overset{O}{\overset{\|}{C}} \{R^7\} \overset{O}{\overset{\|}{C}}$ ... --;

Claim 5, column 11, line 15, " 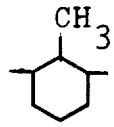 and 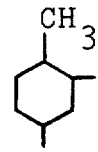 "

should be -- 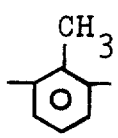 and 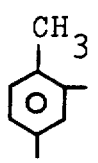 --; and

UNITED STATES PATENT AND TRADEMARK OFFICE
CERTIFICATE OF CORRECTION

PATENT NO. : 4,118,536

DATED : October 3, 1978

INVENTOR(S) : James L. Beardsley and J. LaMar Zollinger

It is certified that error appears in the above-identified patent and that said Letters Patent are hereby corrected as shown below:

Claim 6, column 12, line 5, " 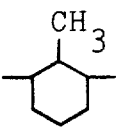 and 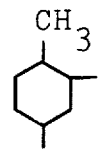 "

should be -- 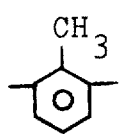 and 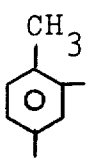 --.

Signed and Sealed this

Thirteenth Day of March 1979

[SEAL]

Attest:

RUTH C. MASON
Attesting Officer

DONALD W. BANNER
Commissioner of Patents and Trademarks